United States Patent
Smith et al.

(10) Patent No.: US 6,678,108 B2
(45) Date of Patent: Jan. 13, 2004

(54) METHOD AND APPARATUS FOR IDENTIFYING SPINDLE IMBALANCE IN A HARD DISK DRIVE

(75) Inventors: Gordon James Smith, Rochester, MN (US); Hal Hjalmar Ottesen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 09/854,637

(22) Filed: May 14, 2001

(65) Prior Publication Data

US 2003/0030936 A1 Feb. 13, 2003

(51) Int. Cl.$^7$ ............................................. G11B 5/596
(52) U.S. Cl. ................................................... 360/77.04
(58) Field of Search ........................ 360/77.04, 97.02, 360/77.03, 78.14; 318/561

(56) References Cited

U.S. PATENT DOCUMENTS

| | | | |
|---|---|---|---|
| 4,697,127 A | 9/1987 | Stich et al. | 318/561 |
| 5,402,280 A | 3/1995 | Supino | 360/77.04 |
| 5,914,830 A | 6/1999 | Kadlec et al. | 360/78.14 |
| 6,088,185 A | 7/2000 | Ratliff et al. | 360/77.03 |
| 6,094,047 A | 7/2000 | Guzik et al. | 324/173 |
| 6,122,139 A | 9/2000 | Sri-Jayantha et al. | 360/97.02 |
| 6,556,371 B1 * | 4/2003 | Ottesen et al. | 360/77.04 |

OTHER PUBLICATIONS

S.K. Mitra, "Digital Signal Processing—A Computer–Based Approach", McGraw–Hill (1998), pp. 520–523.

* cited by examiner

*Primary Examiner*—David Hudspeth
*Assistant Examiner*—Mitchell Slavitt
(74) *Attorney, Agent, or Firm*—Joan Pennington

(57) ABSTRACT

A method and apparatus are provided for identifying spindle imbalance in a hard disk drive. Position error signal (PES) samples are received from a plurality of sectors of a predefined cylinder for a plurality of disk surfaces. The PES samples are measured and stored for a defined number of revolutions for each of the plurality of disk surfaces. For each of the plurality of disk surfaces, a repeatable runout (RRO) of the PES is computed for the defined number of revolutions. A first harmonic discrete Fourier transform (DFT) and a first harmonic phase of the RRO are computed. Then a mean repeatable runout (MRRO) is computed. A first harmonic DFT and a first harmonic overall phase of the MRRO are computed. For each of the plurality of disk surfaces, cross-correlation coefficients are computed and summed to identify a spindle imbalance factor. The identified spindle imbalance factor is compared with a predefined threshold value to identify spindle imbalance in the hard disk drive. An available controller in the disk drive can perform the method to identify spindle imbalance. In a Redundant Arrays of Inexpensive Disks (RAID) system, the RAID controller performs the method to identify spindle imbalance.

20 Claims, 8 Drawing Sheets

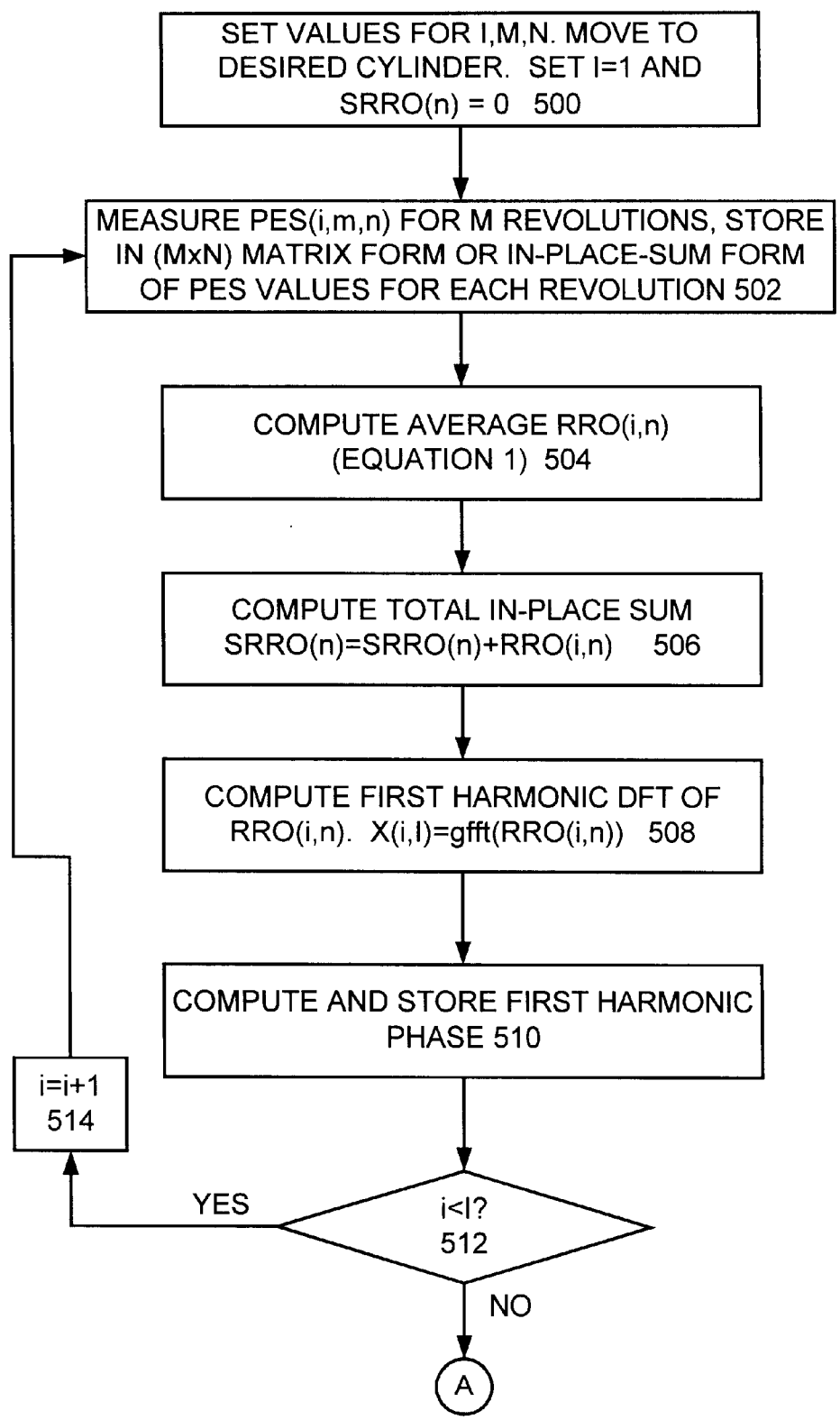

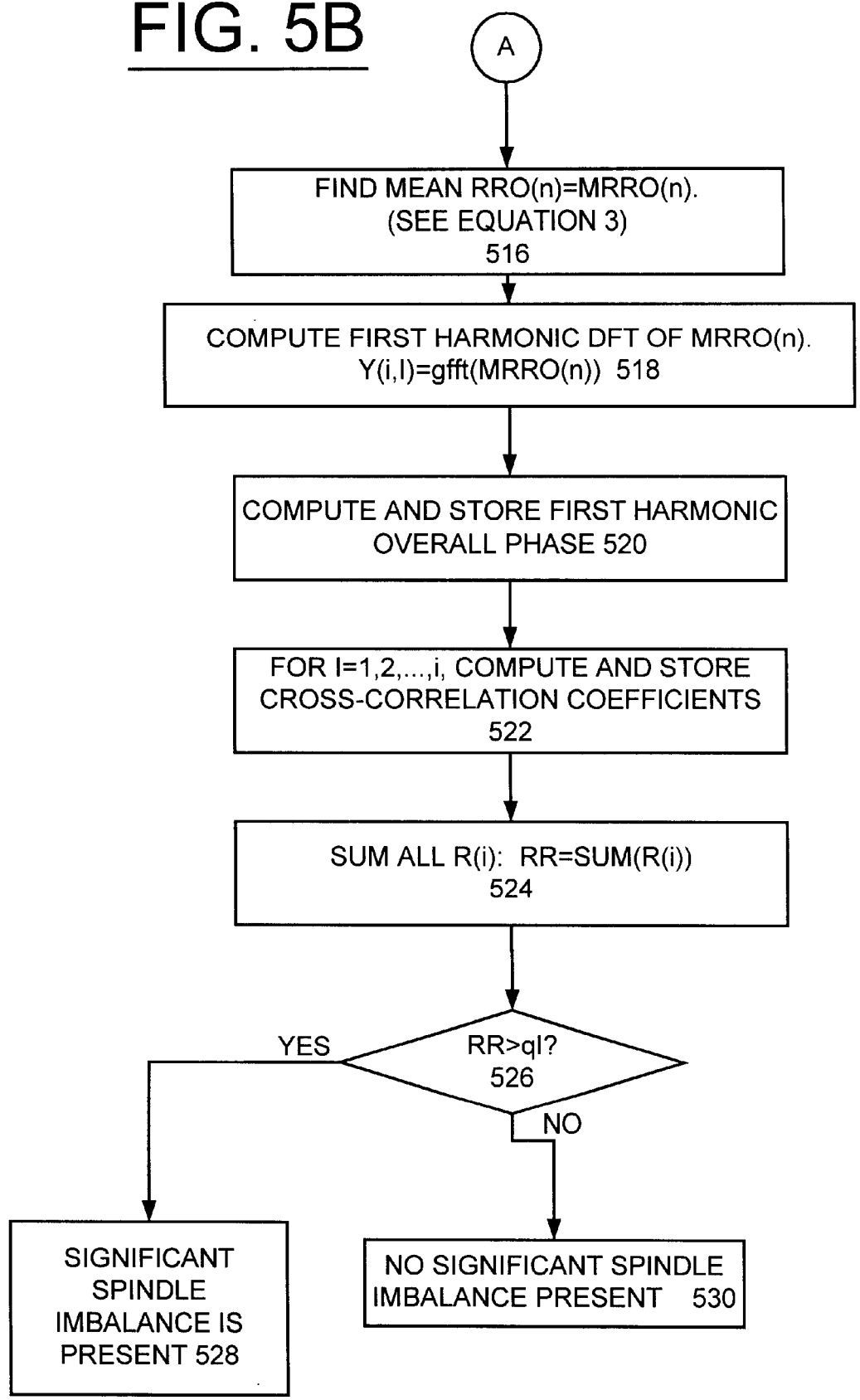

METHOD AND APPARATUS FOR IDENTIFYING SPINDLE IMBALANCE IN A HARD DISK DRIVE

FIELD OF THE INVENTION

The present invention relates generally to the data processing field, and more particularly, relates to a method and apparatus for identifying spindle imbalance in a hard disk drive.

DESCRIPTION OF THE RELATED ART

Every facet of the E-commerce market is growing at a phenomenal rate. Most E-commerce systems consist of a computer system with one or more Redundant Arrays of Inexpensive Disks (RAID) storage systems. Almost all of the online catalogs and order/shipping data will be stored on RAIDs. These E-commerce systems are 24-hour-a-day, seven-day-per-week systems, and they have to operate at peak efficiency at all times. It is clear that such tremendous growth will demand the outmost of the computer systems supporting the worldwide E-commerce traffic reliably and expediently.

Modern disk drives are becoming more sophisticated with lower flyheight, higher areal recording densities, and faster rotational spindle velocities. One of the problems that arise in disk drive spindles is the spindle imbalance. This occurs when the center of gravity of the spindle does not coincide with the center of rotation. The net result is a mechanical sinusoidal vibration occurring at the fundamental spindle frequency. The causes for the spindle imbalance are many. Some of the most common imbalance-problems include mechanical tolerances in the bearings, the spindle shaft, and the disks; the mechanical assembly, like clamping and positioning, of the disk spindle; twisting of the disk enclosure while physically mounting the HDD in a RAID frame; the mechanical shocks caused in shipping of the HDD; slip or micro-creep of one or more disks during normal operation; age and wear of the mechanical structure, temperature cycling, and the like.

A spindle imbalance in a hard disk drive (HDD) causes mechanical vibrations in the disk drive enclosure and mounting frame. If this disk drive is situated in a RAID (Redundant Arrays of Inexpensive Disks), then the mechanical vibrations will disturb the neighboring HDDs and cause additional Track Mis-Registration (TMR) problems.

A need exists for a field upgradeable method that can screen HDDs for potential spindle imbalance problems before the drives are used, for example, in a RAID. Secondly, a need exists for a field upgradeable method to identify drives that develop the spindle imbalance problem during normal operation, so that such drives can be replaced or repositioned, to maintain peak performance of the E-commerce server system.

A need exists for an improved method and apparatus for identifying spindle imbalance in a hard disk drive.

SUMMARY OF THE INVENTION

A principal object of the present invention is to provide a method and apparatus for identifying spindle imbalance in a hard disk drive. Other important objects of the present invention are to provide such method and apparatus for identifying spindle imbalance in a hard disk drive substantially without negative effect and that overcome many of the disadvantages of prior art arrangements.

In brief, a method and apparatus are provided for identifying spindle imbalance in a hard disk drive. A position error signal (PES) is received from a plurality of sectors of a predefined cylinder for a plurality of disk surfaces. The PES is measured and stored for a defined number of revolutions for each of the plurality of disk surfaces. For each of the plurality of disk surfaces, a repeatable runout (RRO) of the PES is computed for the defined number of revolutions. A first harmonic discrete Fourier transform (DFT) and a first harmonic phase of the RRO are computed. Then a mean repeatable runout (MRRO) for the plurality of disk surfaces is computed. A first harmonic DFT and a first harmonic overall phase of the MRRO are computed. For each of the plurality of disk surfaces, cross-correlation coefficients are computed and summed to identify a spindle imbalance factor. The identified spindle imbalance factor is compared with a predefined threshold value to identify spindle imbalance in the hard disk drive.

In accordance with features of the invention, an available controller in the disk drive performs the method of the invention to identify spindle imbalance. In a Redundant Arrays of Inexpensive Disks (RAID) system, the RAID controller performs the method of the invention to identify spindle imbalance.

BRIEF DESCRIPTION OF THE DRAWINGS

The present invention together with the above and other objects and advantages may best be understood from the following detailed description of the preferred embodiments of the invention illustrated in the drawings, wherein:

FIGS. 5A and 5B are flow charts illustrating exemplary steps for identifying spindle imbalance in accordance with the preferred embodiment.

DETAILED DESCRIPTION OF THE INVENTION

Figure 1:
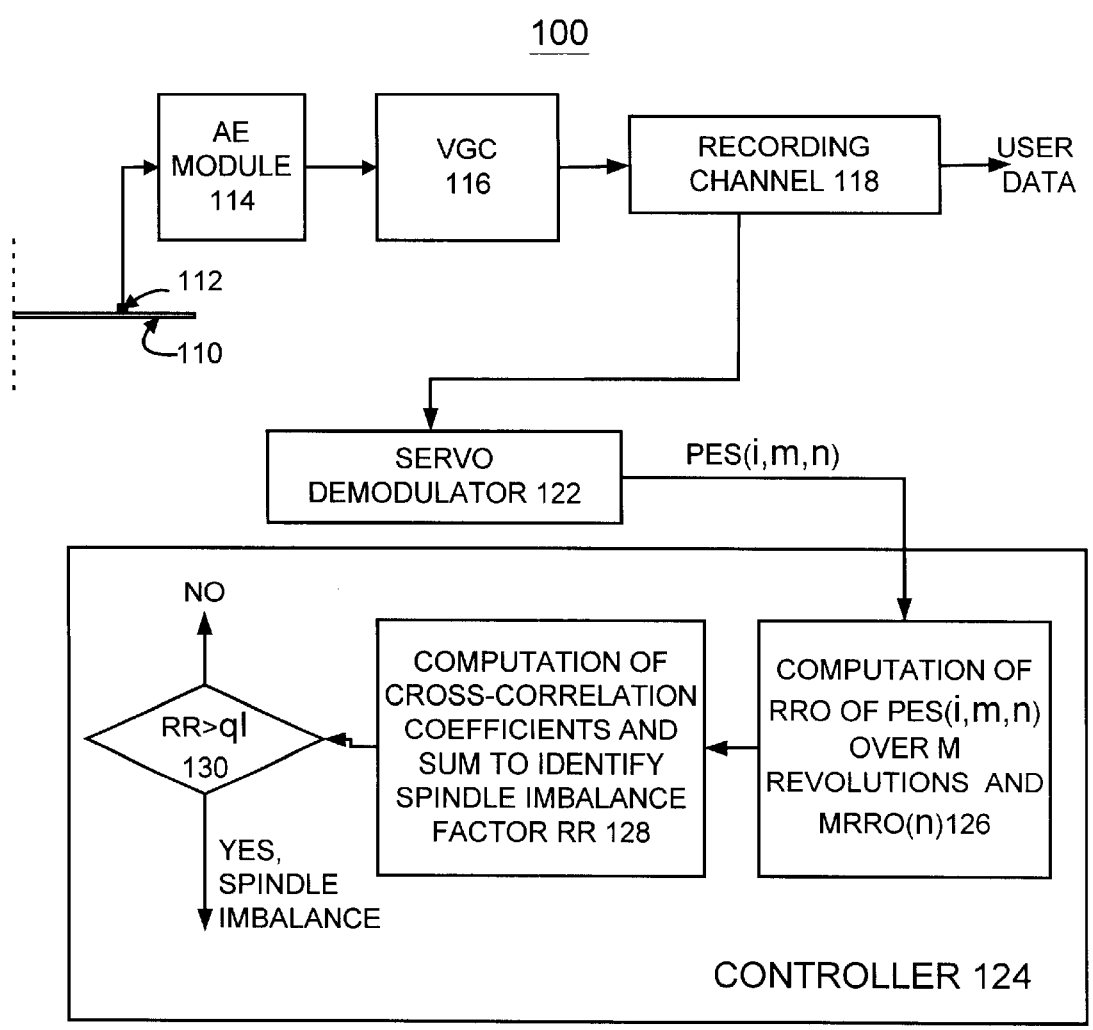
FIG. 1 is a schematic and block diagram representation illustrating a direct access storage device (DASD) for implementing methods for identifying spindle imbalance in accordance with the preferred embodiment.

Having reference now to the drawings, in FIG. 1, there is shown a direct access storage device (DASD) or disk drive generally designated by 100 for implementing methods for identifying spindle imbalance in accordance with the preferred embodiment. As shown in FIG. 1, DASD 100 includes a recorded disk 110 that is spun at constant speed and a recording head 112 that is positioned on a given track for reading information stored on that track. The readback signal is highpass-filtered by an arm electronic (AE) module 114 and applied to a variable gain amplifier (VGA) 116. A recording channel 118 coupled to the VGA 116 separates user data from servo data. The separated servo data is fed into a servo demodulator 122 that provides a position error signal (PES). The PES is designated as PES(i,m,n) where i is the surface index, m is the revolution index and n is the sector index. A controller 124, typically the servo processor, in DASD 100 performs a spindle imbalance identification algorithm (SIIA) of the preferred embodiment as illustrated and described with respect to FIGS. 5A and 5B.

In accordance with features of the preferred embodiment, as described below, the position error signal (PES) is very useful in the detection of the spindle imbalance. Assume a disk drive 100 has a total number of I recording surfaces, N servo sectors per revolution, and that PES-data is taken for M consecutive revolutions. The instantaneous position error signal for the i-th surface, the m-th revolution, and the n-th servo sector is designated as PES(i, m, n). The position error signal can be separated into its repeatable part, i.e., the position error that repeats every revolution at a local sector, and its non-repeatable part. In accordance with the preferred embodiment, we are interested in the periodic or synchronous PES component. This component is often referred to the repeatable runout (RRO) and is defined in Equation (1) as the in-place average of PES(i, m, n) over M complete revolutions as follows:

$$RRO(i, n) = (1/M) \sum_{m=1}^{M} PES(i, m, n) \quad (1)$$

where RRO(i,n) is the repeatable runout sequence of length N at a specific cylinder, often at an outside cylinder, for the i-th disk surface.

Spindle imbalance is a mechanical sinusoidal vibration with a frequency corresponding to the fundamental spindle frequency. The fundamental spindle frequency is identical to the first harmonic frequency of the Discrete Fourier Transform (DFT) of the repeatable runout RRO(i,n). The spindle imbalance is a common-mode disturbance to all disk surfaces, since all the disks are clamped to the spindle shaft and rotate at the same spindle velocity. The repeatable runout RRO(i,n) can be expressed as a discrete Fourier series consisting of weighted terms of harmonic sinusoidal components with arbitrary phase terms. The first harmonic component of RRO(i,n) can be defined as x(i,n) given by.

$$x(i,n) = A_i \sin(\omega_1 n + \theta_i), \, i=1,2,3, \ldots I; \, n=0,1,2, \ldots N-1 \quad (2)$$

In equation 2, the discrete frequency $\omega_1 = 2\Pi/N$ is the same for all disk surfaces. The in-place average of the repeatable runout in equation 1 across all the disk surfaces will be designated as the mean RRO or MRRO defined by:

$$MRRO(n) = (1/I) \sum_{i=1}^{I} RRO(i, n) \quad (3)$$

Again expressing MRRO(n) as a discrete Fourier series consisting of weighted terms of harmonic sinusoidal components with arbitrary phase terms, the first harmonic component of MRRO(n) is defined by y(n) given by:

$$y(n) = B\sin(\omega_1 n + \alpha), \, n=0,1,2, \ldots N-1 \quad (4)$$

Identification of spindle imbalance of the preferred embodiment is based upon the application of the cross-correlation coefficient R(x,y) defined by the equation:

$$R(x, y) = \frac{\sum_{n=0}^{N-1} x(n)y(n)}{sqrt\left(\sum_{n=0}^{N-1} x^2(n) \sum_{n=0}^{N-1} y^2(n)\right)} \quad (5)$$

where both x(n) and y(n) are sequences of length N. It can be shown that the cross-correlation coefficient R(xi,y) between the first harmonic sequence x(i,n) defined in equation 2 and y(n) defined in equation 4 can be found from straight forward trigonometric manipulation of equation 5 to be:

$$R(x_i, y) = \cos(\theta_i - \alpha), \, i=0,1,2, \ldots I \quad (6)$$

Figure 2:
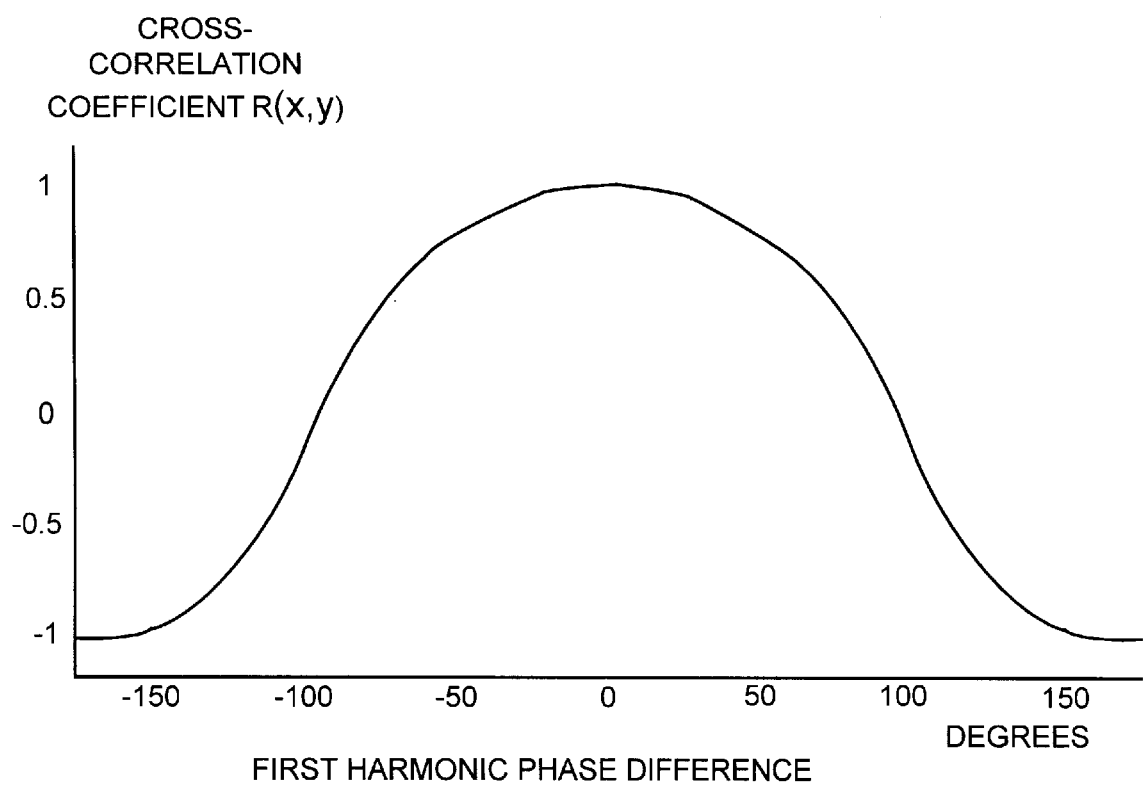
FIG. 2 is a chart illustrating a cross-correlation coefficient R(xi, y) shown along the vertical axis versus a first harmonic phase difference (θi–α) in degrees shown along the horizontal axis in accordance with the preferred embodiment.

Referring also to FIG. 2, there is shown a chart illustrating a cross-correlation coefficient R(xi, y) shown along the vertical axis versus a first harmonic phase difference (θi–α) in degrees shown along the horizontal axis in accordance with the preferred embodiment. Note that the range of cross-correlation coefficient R(xi, y) is −1.0<=R(xi, y)<=1.0. When x(i,n) and y(n) are in-phase, then R(xi, y)=1. If R(xi, y)=−1.0, then the two sequences are out-of-phase. Observe when the phase difference is +/−90 degrees, then the two sequences are uncorrelated, that is R(xi, y)=0.

Equation 6 reveals the interesting result that the correlation coefficient is only dependent on the first harmonic phase difference between RRO(i,n) and MRRO(n). The first harmonic phase can be found by computing the first harmonic discrete Fourier transformation (DFT) of equations1 and 3, called X(i,1) and Y(1), respectively. The first harmonic phase is found from the arctangent of the ratio of the imaginary term to the real term as defined in equations 7 and 8:

$$\theta_i = \tan^{-1}\left[\frac{\text{imag}(X(i, 1))}{\text{real}((X(i, 1))}\right] \quad (7)$$

$$\alpha = \tan^{-1}\left[\frac{\text{imag}(Y(1))}{\text{real}(Y(1))}\right] \quad (8)$$

The Goertzel's algorithm is an elegant recursive approach to computing the DFT when only one or a few samples of the DFT are required. In the preferred embodiment only the evaluation of first harmonic DFT is needed. This method consists almost entirely of real additions and multiplications with only one complex multiplication and one complex addition required per frequency sample. It does not require that N be a power of two. See S. K. Mitra, Digital Signal Processing—A Computer-Based Approach, McGraw-Hill (1998), pp. 520–523.

It should be understood that other sources than spindle imbalance may contribute to the repeatable runout RRO(i,n). Two of the most common and largest contributors are: 1. Frozen-in track-centerline offsets caused by resonance vibrations in the head/suspension/arm structure, the disk warping (potato-chipping), the external servo-writer systems vibrations, and the spindle runout present during the initial writing of the servo patterns in the manufacturing process of the HDD. 2. Errors in the registration of the written servo patterns due to local media defects, local media coersivity changes, instantaneous head/disk flyheight, and the like.

With the exception of the initial spindle runout, these other RRO disturbance sources as they appear on individual disk surfaces, however, are more random in nature. Thus, the absence of any strong spindle runout, there is usually not a strong correlation between the RROs of individual disk surfaces. A strong correlation is synonymous with having a cross-correlation between the RROs of individual disk surfaces close to +1. Adding the RROs of individual disk surfaces gives a sum RR defined in equation 9:

$$RR = \sum_{i=1,}^{I} R(x_i, y) \qquad (9)$$

An available controller 124 in DASD 100 advantageously performs the functions of blocks 124, 128 and 130 in accordance with the spindle imbalance identification algorithm (SIIA) of the preferred embodiment. Computation of RRO of PES(i,m,n) over M revolutions and MMRO(n) is provided at a function block 126 in DASD 100 in FIG. 1. Computation of cross-correlation coefficients and sum to identify spindle imbalance factor RR is provided at a function block 128. Identification of spindle imbalance is provided at a compare block 130 in DASD 100 in FIG. 1 where the spindle imbalance factor RR is compared with a threshold value qI, where the factor q is a positive number less than one.

In accordance with features of the preferred embodiment, an improved method and apparatus for identifying spindle imbalance in a hard disk drive are provided. The identification of HDDs with spindle imbalances at manufacturing-time can be used to prevent these drives from populating a RAID. The in-situ identification of an HDD drive that develops a spindle imbalance in the RAID frame in the customers office, allows for removal or alternate physical positioning of the disturbing HDD. The net result is a better performing and more reliable RAID storage system.

Figure 3:
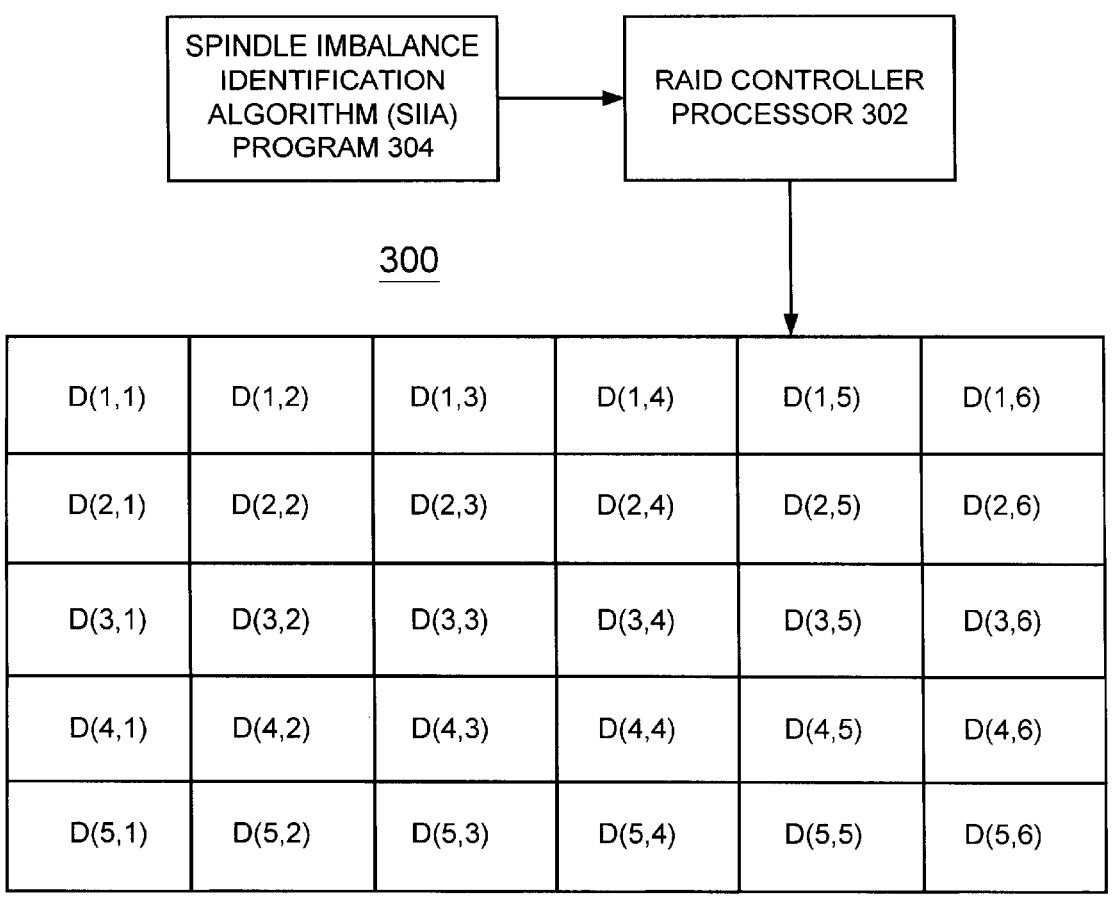
FIG. 3 is a block diagram representation illustrating a Redundant Arrays of Inexpensive Disks (RAID) storage system for implementing methods for identifying spindle imbalance in accordance with the preferred embodiment.

Referring now to FIG. 3, there is shown a Redundant Arrays of Inexpensive Disks (RAID) storage system generally designated by 300 for implementing methods for identifying spindle imbalance in accordance with the preferred embodiment. An exemplary (5×6) RAID storage system 300 is shown. Mechanical vibrations from a spindle imbalance are identified on any disk enclosure D(1,1)–D(5,6) using a RAID controller processor 302 operatively controlled by a spindle imbalance identification algorithm (SIIA) program 304 in accordance with the preferred embodiment. A disk drive with imbalance spinning at 10,000 RPM will have a fundamental 120-Hz mechanical vibration frequency. These mechanical vibrations act as physical disturbances in the immediate environment of the HDD. For example, the immediate environment of a disturbing HDD, such as HDD labeled D(3,3), is identified on the disk enclosure D(3.,3) in accordance with the preferred embodiment. The eight nearest neighbors, that is D(2,2), D(2,3), D(2,4), D(3,4), D(4,4), D(4,3), D(4,2), and D(3,2), will be most affected or disturbed by D(3,3). Replacing the D(3,3) with a new HDD solve the problem. Swapping D(3,3)'s place with outer-frame drives D(1,1), D(1,6), D(5,1), or D(5,6) also will minimize the problem. Note that these drives have only three neighbors. Other outer-frame drives, like D(1,2), D(3,6), D(5,5), D(4,1), and the like have five neighbors.

In accordance with features of the preferred embodiment, the method and apparatus of the preferred embodiment use existing hardware and detects any disk drive 100 in a RAID system, such as RAID system 300 with a spindle imbalance with field-upgradeable software of the spindle imbalance identification algorithm (SIIA) program 304.

While the use of arctangent and cosine are shown in the computation of the spindle imbalance, it should be understood that it is possible to represent the functions as nested series approximations to reduce the computational burden. In operation, the computational burden for the spindle imbalance identification algorithm (SIIA) is small. The SIIA computations for each disk drives in the RAID 300 are performed by the RAID controller processor 302. The SIIA computations for the RAID system 300 advantageously are executed at scheduled periods of time.

Figure 4A:
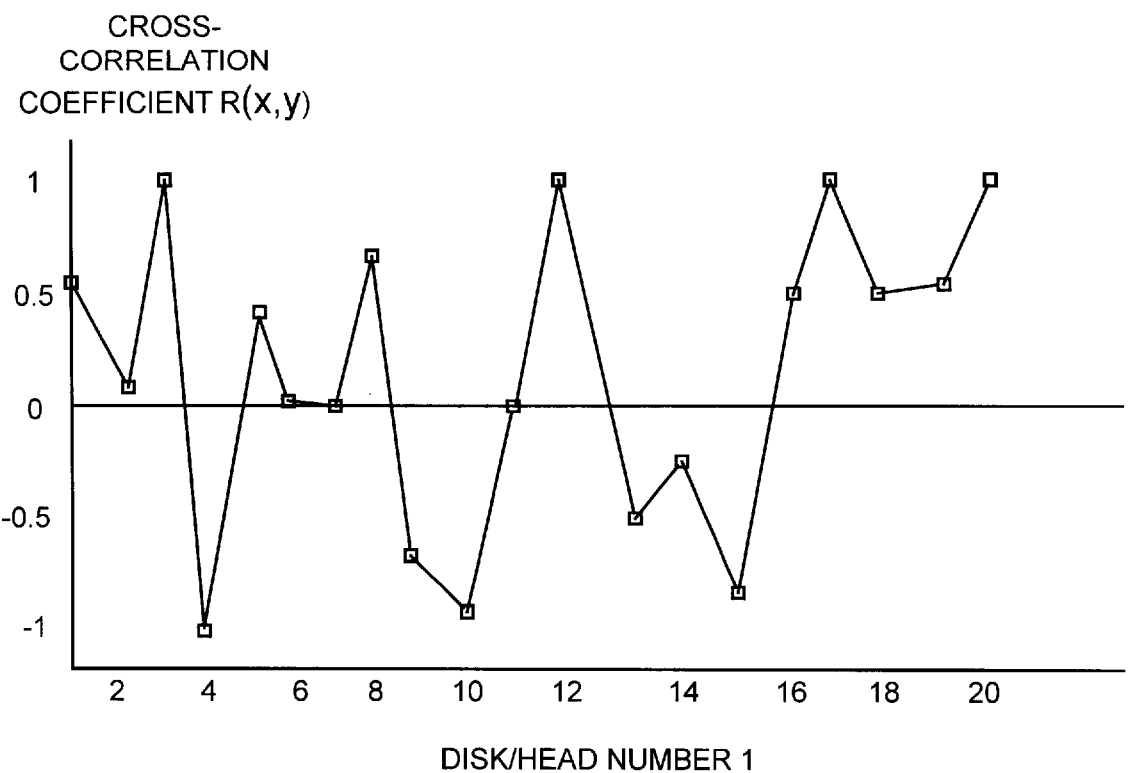
FIGS. 4A and 4B are charts respectively illustrating a cross-correlation coefficient R(xi, y) shown along the vertical axis versus twenty surfaces of a disk drive in accordance with the preferred embodiment.
Figure 4B:
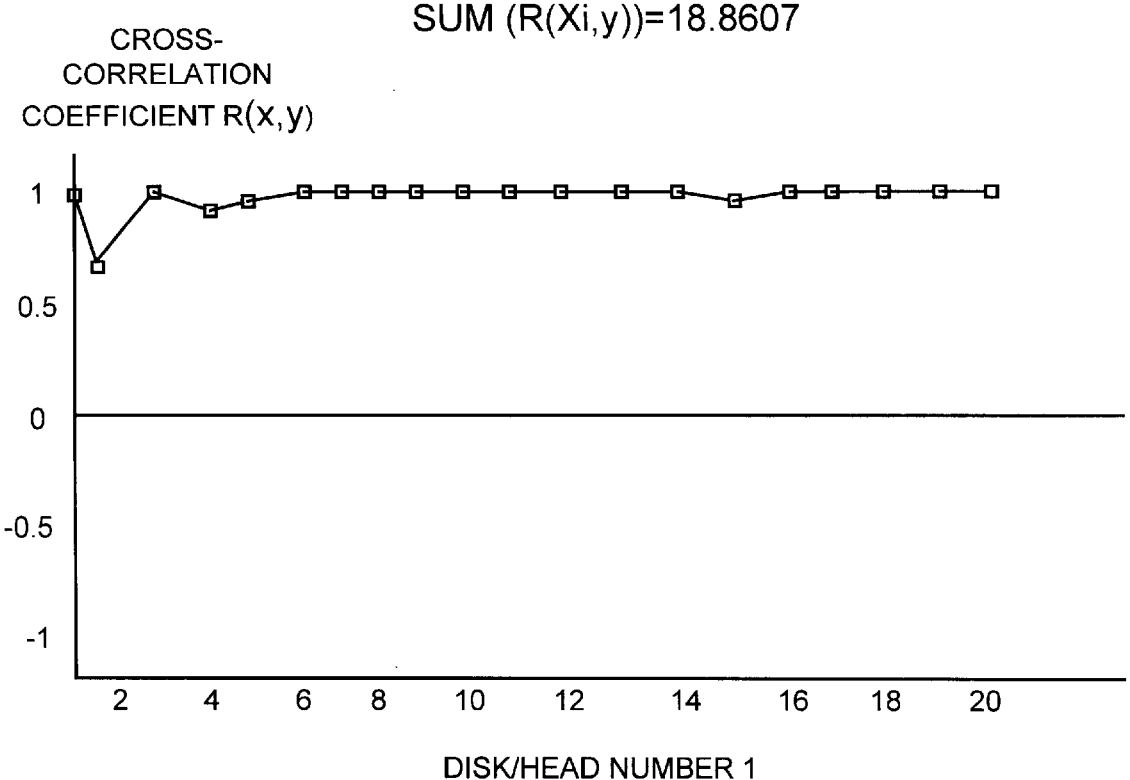

Referring also to FIGS. 4A and 4B, there are shown charts respectively illustrating a cross-correlation coefficient R(xi, y) shown along the vertical axis versus twenty surfaces of a disk drive in accordance with the preferred embodiment. In FIG. 4A, the graph shows the individual cross-correlation coefficients $R(x_i,y)$ from the twenty surfaces (10 disks) of a disk drive 100 spinning at 10,000 RPM. The data was obtained from position error signals at an outer cylinder taken for 20 revolutions on each surface. The data was processed in accordance with the preferred embodiment as illustrated and described with respect to FIGS. 5A and 5B. Note from FIG. 4A, that the cross-correlation coefficients $R(x_i,y)$ are generally evenly distributed between −1 and +1. This suggests that there is no strong spindle-imbalance component present in the data. Adding the twenty cross-correlation coefficients $R(x_i,y)$ gives the sum RR applying equation 9:

$$RR = \sum_{i=1,}^{I} R(x_i, y) = 2.6275$$

In FIG. 4B, a repeatable runout disturbance was added to the $R(x_i,y)$ used in FIG. 4A. This sinusoidal disturbance sequence was of the same length N with peak amplitude equal to the largest amplitude of the RROs in the disk spindle. The sinusoidal amplitude in this case was equal to 6.65. This first harmonic sinusoidal disturbance simulates the effect of a spindle imbalance. From FIG. 4B, it can be seen that all of the cross-correlation coefficients $R(x_i,y)$ are close to +1 which implies that the repeatable runouts for all disk surfaces are strongly correlated. Adding the twenty cross-correlation coefficients $R(x_i,y)$ gives the sum RR applying equation 9:

$$RR = \sum_{i=1,}^{I} R(x_i, y) = 18.8607$$

Referring now to FIGS. 5A and 5B, there are shown exemplary steps for identifying spindle imbalance in accordance with the preferred embodiment. First as indicated in a block 500, the HDD parameters are set for the PES data gathering per recording surface including the number of recording surfaces I, the number of servo sectors per revolution N and the number of consecutive full revolutions M; the recording head 112 is moved to a given cylinder on surface i=1 and the sum RRO sequence, a N-point vector, SRRO(n) is initialized to zero. Here n is the servo sector index sequence. The raw position error PES(i,m,n) is measured for M revolutions and stored in (M×N) matrix form or in-place-sum form of PES values for each revolution as indicated in a block 502. The averaged position error per sector (in-place) taken for M revolutions are computed as indicated in a block 504 to yield the repeatable runout sequence RRO(i,n). This step is shown in equation 1:

$$RRO(i, n) = (1/M)\sum_{m=1}^{M} PES(i, m, n) \quad (1)$$

Computation of the total in-place sum sequence SRRO(n) is performed as indicated in a block 506.

Next using a discrete Fourier transform (DFT) method, such as Goerzel's algorithm (gift), the first harmonic DFT X(1,1), a complex number is computed as indicated in a block 508 from RRO(i,n) using a N-point transform. As indicated in a block 510, the first harmonic phase $\theta_i$ is computed using equation 7:

$$\theta_i = \tan^{-1}\left[\frac{\text{imag}(X(i, 1))}{\text{real}((X(i, 1))}\right] \quad (7)$$

As indicated in a decision block 512, the recording surface index i is compared to the total number of recording surfaces I. If the index i is less than I, then the index i is incremented by 1 as indicated in a block 514 and the process is repeated on the recording surface i+1 returning to block 502. If the index i is equal to the value I, all recording surfaces have been processed, the sequential steps continue in FIG. 5B.

Referring to FIG. 5B, as indicated in a block 516, the mean RRO(n)=MRRO(n) is computed using equation 3:

$$MRRO(n) = (1/I)\sum_{i=1}^{I} RRO(i, n) \quad (3)$$

Next the first harmonic DFT Y(1) is computed from MRRO (n) using a N-point transform as indicated in a block 518. As indicated in a block 520, the first harmonic overall phase is computed using equation 8:

$$\alpha = \tan^{-1}\left[\frac{\text{imag}(Y(1))}{\text{real}(Y(1))}\right] \quad (8)$$

Next for I=1,2, . . . I, cross-correlation coefficients R(i)=R $(x_i,y)=\cos(\theta_i-\alpha)$ between the sequences RRO(i,n) and the MRRO(n) sequence are computed and stored as indicated in a block 522. As indicated in a block 524, the individual cross-correlation coefficients R(i) are summed to provide the spindle imbalance factor RR according to equation 9:

$$RR = \sum_{i=1}^{I} R(x_i, y) \quad (9)$$

The spindle imbalance factor RR is compared with the threshold value qI to determine whether significant spindle imbalance is present as indicated in a decision block 526. In the presence of strong spindle imbalance, all cross-correlation coefficients are equal to unity (+1) and the spindle imbalance factor RR becomes equal in value to the total number of recording surfaces I that is RR=I. Thus in decision block 526, where RR>qI, where the factor q is a positive number less than one, significant spindle imbalance is present as indicated in a block 528. When RR≦qI, then no significant spindle imbalance is present as indicated in a block 530.

The following TABLE 1 shows computations in accordance with the preferred embodiment for respective disk drives, HDDs 1, 2 with no significant spindle imbalance and with significant spindle imbalance. The data was processed using the method of the preferred embodiment of FIGS. 5A and 5B. Similar data was taken at an inner cylinder and an outer cylinder. The computations were then repeated for a moderate runout disturbance simulating a spindle imbalance. TABLE 1 shows the results of these computations.

TABLE 1

| Disk Drive | Cylinder | Spindle Imbalance Factor RR | |
|---|---|---|---|
| | | No Disturbance | With Disturbance |
| HDD 1 | OD | 2.63 | 18.86 |
| | ID | 1.19 | 14.87 |
| HDD 2 | OD | 7.17 | 18.61 |
| | ID | 4.18 | 16.21 |

TABLE 1 shows in all cases for the two HDDs 1, 2 that the value of the spindle imbalance factor RR increases in the presence of a runout disturbance. HDD 2 shows a higher tendency to identify spindle imbalance due to the larger numbers in the no disturbance case. The accuracy of the method can be improved by making the spindle-balance decision based on the average of several cylinders evenly spaced across the recording surface. This averaging process will reduce the local effects and enhance the effects of a common mode spindle imbalance disturbance.

Figure 6:
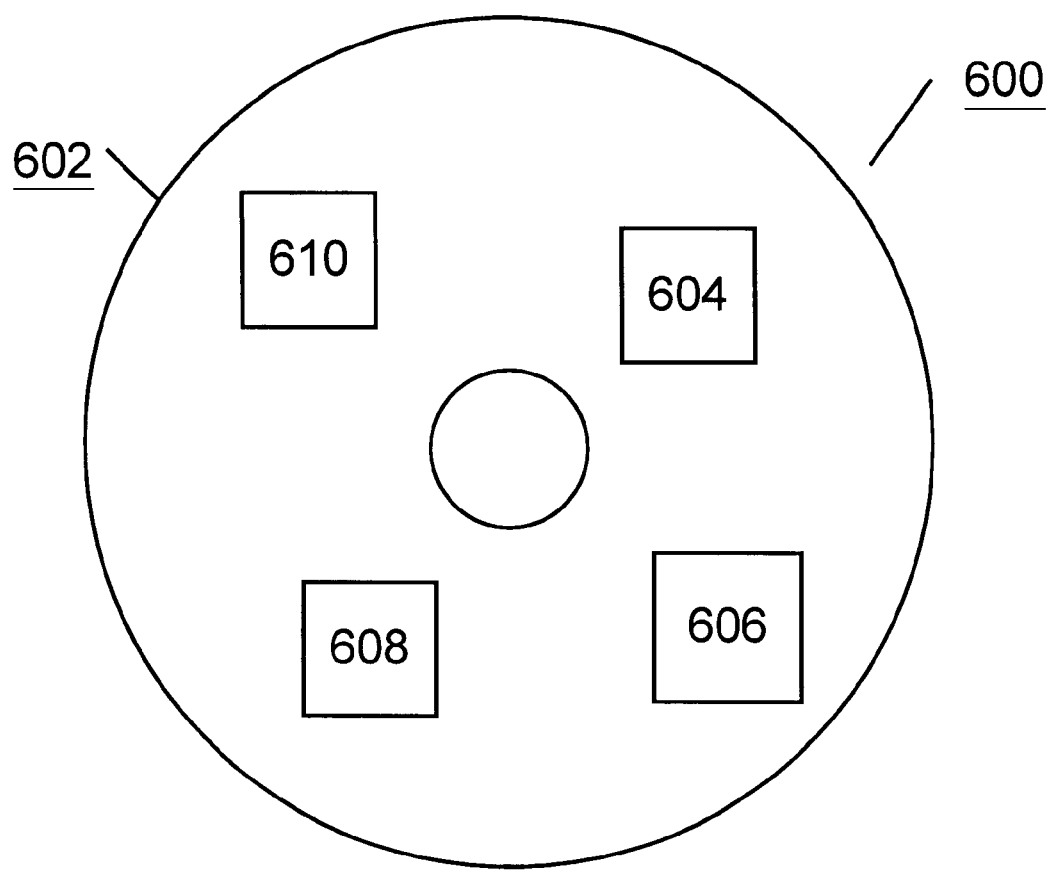
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for identifying spindle imbalance of the preferred embodiment in the disk drive 100 of FIG. 1.

A sequence of program instructions or a logical assembly of one or more interrelated modules defined by the recorded program means 604, 606, 608, 610, direct the disk drive 100 for identifying spindle imbalance of the preferred embodiment.

While the present invention has been described with reference to the details of the embodiments of the invention shown in the drawing, these details are not intended to limit the scope of the invention as claimed in the appended claims.

What is claimed is:

1. Apparatus for identifying spindle imbalance in a hard disk drive comprising:

a processor, said processor for receiving position error signal (PES) samples from a plurality of sectors of a predefined cylinder for a plurality of disk surfaces;

said processor for measuring and storing said PES samples for a defined number of revolutions for each of said plurality of disk surfaces;

said processor for computing a repeatable runout (RRO) of said PES samples for said defined number of revolutions;

said processor for computing a first harmonic discrete Fourier transform (DFT) and a first harmonic phase of said RRO;

said processor for computing a mean repeatable runout (MRRO);

said processor for computing a first harmonic DFT and a first harmonic phase of said MRRO;

said processor for each of said plurality of disk surfaces, for computing cross-correlation coefficients and summing said computed cross-correlation coefficients to identify a spindle imbalance factor; and said processor for comparing said identified spindle imbalance factor with a predefined threshold value to identify spindle imbalance in the hard disk drive.

2. Apparatus for identifying spindle imbalance in a hard disk drive as recited in claim 1 wherein said processor includes a processor in the hard disk drive.

3. Apparatus for identifying spindle imbalance in a hard disk drive as recited in claim 1 wherein the hard disk drive is included in a Redundant Arrays of Inexpensive Disks (RAID) system and said processor includes a processor in a RAID controller.

4. Apparatus for identifying spindle imbalance in a hard disk drive as recited in claim 1 wherein said processor for computing a repeatable runout (RRO) of said PES samples for said defined number of revolutions includes said processor for computing said repeatable runout (RRO) defined by:

$$RRO(i, n) = (1/M) \sum_{m=1,}^{M} PES(i, m, n) \quad (1)$$

where RRO(i,n) is a repeatable runout sequence of length N at said predefined cylinder; said position error signal PES(i,m,n) where i represents a consecutive one of said plurality of disk surfaces, m represents a number of consecutive full revolutions M, and n represents a number of servo sectors per revolution.

5. Apparatus for identifying spindle imbalance in a hard disk drive as recited in claim 4 wherein said processor for computing a first harmonic discrete Fourier transform (DFT) of said RRO includes said processor for computing said first harmonic discrete Fourier transform (DFT) of said RRO defined by:

$$x(i,n) = A_i \sin(\omega_1 n + \theta_i), i=1, 2, 3, \ldots I; n=0, 1, 2, \ldots N-1$$

where the discrete frequency $\omega_1 = 2\pi/N$ is the same for all disk surfaces.

6. Apparatus for identifying spindle imbalance in a hard disk drive as recited in claim 5 wherein said processor for computing said first harmonic phase of said RRO is defined by:

$$\theta_i = \tan^{-1}\left[\frac{\text{imag}(X(i, 1))}{\text{real}((X(i, 1))}\right]$$

where X(i,1) is found by computing said first harmonic discrete Fourier transform (DFT) of said RRO.

7. Apparatus for identifying spindle imbalance in a hard disk drive as recited in claim 6 wherein said processor for computing a mean repeatable runout (MRRO) is defined by:

$$MRRO(n) = (1/I) \sum_{i=1}^{I} RRO(i, n).$$

8. Apparatus for identifying spindle imbalance in a hard disk drive as recited in claim 7 wherein said processor for computing said first harmonic DFT of said MRRO is defined by:

$$y(n) = B \sin(\omega_1 n + \alpha), n=0, 1, 2, \ldots N-1.$$

9. Apparatus for identifying spindle imbalance in a hard disk drive as recited in claim 1 wherein said processor for computing said first harmonic phase of said MRRO is defined by:

$$\alpha = \tan^{-1}\left[\frac{\text{imag}(Y(1))}{\text{real}(Y(1))}\right].$$

10. Apparatus for identifying spindle imbalance in a hard disk drive as recited in claim 9 wherein said processor for each of said plurality of disk surfaces, for computing cross-correlation coefficients R(x,y) to identify a spindle imbalance factor is defined by:

$$R(x, y) = \frac{\sum_{n=0}^{N-1} x(n)y(n)}{\text{sqrt}\left(\sum_{n=0}^{N-1} x^2(n) \sum_{n=0}^{N-1} y^2(n)\right)}$$

where both x(n) and y(n) are sequences of length N.

11. Apparatus for identifying spindle imbalance in a hard disk drive as recited in claim 10 wherein said cross-correlation coefficients R(x,y) is defined by:

$$R(x_i, y) = \cos(\theta_i - \alpha), i=0, 1, 2, \ldots I.$$

12. Apparatus for identifying spindle imbalance in a hard disk drive as recited in claim 11 wherein said cross-correlation coefficients R(x,y) equals 1 when sequences x(i,n) and y(n) are in-phase.

13. Apparatus for identifying spindle imbalance in a hard disk drive as recited in claim 11 wherein said cross-correlation coefficients R(x,y) equals −1 when sequences x(i,n) and y(n) are out-of-phase.

14. Apparatus for identifying spindle imbalance in a hard disk drive as recited in claim 11 wherein said cross-correlation coefficients R(x,y) equals zero when sequences x(i,n) and y(n) are uncorrelated.

15. Apparatus for identifying spindle imbalance in a hard disk drive as recited in claim 9 wherein said processor for each of said plurality of disk surfaces, for summing said cross-correlation coefficients R(x,y) to identify said spindle imbalance factor RR is defined by:

$$RR = \sum_{i=1}^{I} R(x_i, y).$$

16. Apparatus for identifying spindle imbalance in a hard disk drive as recited in claim 9 wherein said spindle imbalance factor RR greater than said predefined threshold value identifies spindle imbalance in the hard disk drive.

17. A method for identifying spindle imbalance in a hard disk drive comprising the steps of:

receiving position error signal (PES) samples from a plurality of sectors of a predefined cylinder for a plurality of disk surfaces;

measuring and storing said PES for a defined number of revolutions for each of said plurality of disk surfaces;

computing a repeatable runout (RRO) of said PES samples for said defined number of revolutions;

computing a first harmonic discrete Fourier transform (DFT) and a first harmonic phase of said RRO;

computing a mean repeatable runout (MRRO);

computing a first harmonic DFT and a first harmonic phase of said MRRO;

for each of said plurality of disk surfaces, computing cross-correlation coefficients and summing said computed cross-correlation coefficients to identify a spindle imbalance factor; and comparing said identified spindle imbalance factor with a predefined threshold value to identify spindle imbalance in the hard disk drive.

18. A method for identifying spindle imbalance in a hard disk drive as recited in claim 17 wherein the step of comparing said identified spindle imbalance factor with a predefined threshold value to identify spindle imbalance in the hard disk drive includes the steps of identifying spindle imbalance in the hard disk drive responsive to said identified spindle imbalance factor being greater than predefined threshold value.

19. A computer program product for identifying spindle imbalance in a hard disk drive, said computer program product including a plurality of computer executable instructions stored on a computer readable medium, wherein said instructions, when executed by a controller, cause the controller to perform the steps of:

receiving position error signal (PES) samples from a plurality of sectors of a predefined cylinder for a plurality of disk surfaces, measuring and storing said PES for a defined number of revolutions for each of said plurality of disk surfaces;

computing a repeatable runout (RRO) of said PES samples for said defined number of revolutions;

computing a first harmonic discrete Fourier transform (DFT) and a first harmonic phase of said RRO;

computing a mean repeatable runout (MRRO);

computing a first harmonic DFT and a first harmonic phase of said MRRO;

for each of said plurality of disk surfaces, computing cross-correlation coefficients and summing said computed cross-correlation coefficients to identify a spindle imbalance factor; and comparing said identified spindle imbalance factor with a predefined threshold value to identify spindle imbalance in the hard disk drive.

20. A computer program product for identifying spindle imbalance in a hard disk drive as recited in claim 19 wherein the steps of computing cross-correlation coefficients includes the steps of computing the first harmonic phase difference between said repeatable runout RRO(i,n) and said mean repeatable runout MRRO(n), where i represents a disk surface index and n represents a servo sector index.

* * * * *